United States Patent [19]

Hagisawa et al.

[11] Patent Number: 4,795,872
[45] Date of Patent: Jan. 3, 1989

[54] ELECTROMAGNETIC INDUCTION HEATING APPARATUS INCLUDING A MAGNETIC FLUX DIVERTING ASSEMBLY

[75] Inventors: Nobuyasu Hagisawa, Shizuoka Prefecture; Hiroshi Ikeda, Aichi Prefecture, both of Japan

[73] Assignee: Nippon Light Metal Company Limited, Tokyo, Japan

[21] Appl. No.: 917,093

[22] Filed: Oct. 8, 1986

[30] Foreign Application Priority Data

Oct. 25, 1985 [JP] Japan .................. 60-238703

[51] Int. Cl.⁴ .............................. H05B 5/06
[52] U.S. Cl. .................. 219/10.61 R; 219/10.71; 219/10.43; 219/10.57
[58] Field of Search ............ 219/10.55 M, 10.71, 219/10.57, 10.43, 10.61 R, 10.69, 10.75

[56] References Cited

U.S. PATENT DOCUMENTS

| | | | |
|---|---|---|---|
| 2,448,012 | 8/1948 | Baker | 219/10.61 R |
| 2,448,690 | 9/1948 | Storm | 219/9.5 |
| 3,444,346 | 5/1969 | Russell et al. | 219/10.61 R |
| 4,075,450 | 2/1978 | Lavins, Jr. | 219/10.71 |
| 4,185,183 | 1/1980 | Kamimoto | 219/10.61 R |
| 4,468,549 | 8/1984 | Arnosky | 219/10.57 |

FOREIGN PATENT DOCUMENTS

| | | |
|---|---|---|
| 1202900 | 1/1960 | France . |
| 53-1614 | 1/1978 | Japan . |
| 53-1339 | 1/1978 | Japan . |
| 0040840 | 9/1983 | Japan . |
| 60-92428 | 5/1985 | Japan . |
| 0173352 | 9/1965 | U.S.S.R. . |
| 0701338 | 12/1953 | United Kingdom . |
| 2144609 | 3/1985 | United Kingdom . |

OTHER PUBLICATIONS

Scherg, the German publication entitled, "Uber die Anwendbarkeit . . . ect." Elektrowarme Institut . . . ect. (AIF) pp. 55–62.

Article: *TFX A Big Step Forward in the Continuous Heat Treatment of Metal Strip*–"Light Metal Age", vol. 40, Nos. 11 and 12 (Dec., 1982).

*Primary Examiner*—M. H. Paschall
*Attorney, Agent, or Firm*—Sandler & Greenblum

[57] ABSTRACT

The present invention concerns an electromagnetic induction heating apparatus which is suitable for electromagnetic induction heating a strip which is to be treated such as metal strip. The apparatus incorporates magnetic flux diverting mechanism in the vicinity of both edges of the passing strip which diverts a part of an alternating magnetic flux transversing the strip. In consequence, it is possible to eliminate the generation of extremely high temperature regions at the edge portions of the strip to be treated which is caused by the concentration of magnetic flux, ensuring uniform heating temperature distributions over the entire strip.

11 Claims, 7 Drawing Sheets

ELECTROMAGNETIC INDUCTION HEATING APPARATUS INCLUDING A MAGNETIC FLUX DIVERTING ASSEMBLY

BACKGROUND OF THE INVENTION

1. Field of the Invention

The present invention relates to an electromagnetic induction heating apparatus, and more particularly, to an electromagnetic induction heating apparatus which is suitable for the electromagnetic induction heating of a metal strip.

2. Description of the Prior Art

Of all known methods of continuous heating a flat metal strip on line, electromagnetic induction heating has become popular recently owing to its high heating efficiency and excellent controllability of the heating atmosphere.

FIGS. 1 to 4 show one example of such electromagnetic induction heating apparatus (as disclosed in, for example, the specification of Japanese Patent Publication No. 40840/1983, and Light Metal Age 1982-Vol. 40, Nos. 11, 12, Pages 6–11).

Figure 1:
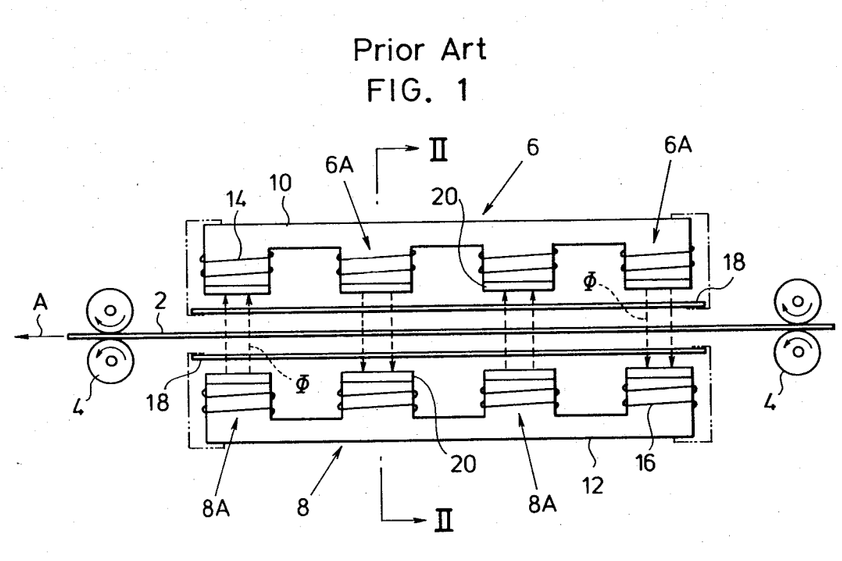
FIG. 1 is a schematic side elevation of a known electromagnetic induction heating apparatus.

In the apparatus of the type shown in FIGS. 1 to 4, a metal strip 2 to be treated is formed into a strip of a predetermined width, and is fed in the direction shown by arrow A by roller mechanisms 4 and a roller-rotating portion (not shown) which actuates the roller mechanisms 4. Electromagnetic portions 6 and 8 are held opposite to each other by support mechanism (not shown) above and below the metal strip 2 as viewed in FIG. 1 at a predetermined spacing, thereby forming a passage through which the strip to be treated is conveyed. The electromagnetic portions 6 and 8 are composed of four electromagnets 6A and 8A, respectively, forming four pairs of electromagnets. The longitudinal direction of each electromagnet 6A or 8A is aligned in the direction of movement of the metal strip 2, and the electromagnets 6A and 8A respectively have a core 10 and 12. The cores 10 and 12 each have a substantially comblike configuration as seen from the side, are rectangular in plan view, and are wound with coils 14 and 16, respectively, as shown in FIG. 1. When an alternating current is passed through the coils 14 and 16, transverse magnetic flux $\phi$ of an instantaneous value is therefore generated perpendicular to the metal strip 2 as shown by the dotted lines in FIGS. 1 and 2, thereby inducing eddy currents in the metal strip 2 as shown, for example, in FIG. 3, and the metal strip 2 is heated very rapidly by resultant of Joule heat.

Heat shielding materials 18 for shielding the heat radiated by the heated metal strip 2 are provided. Each of the electromagnets 6A and 8A contains a cooling pipe (not shown) which prevents the electromagnet from overheating.

In the apparatus arranged in this manner, an aluminum coil material which has a thickness of between, for example, 0.25 and 2.0 mm is moved at a speed of between 5 to 200 m/min, so that an alternating magnetic field of 60 to 400 Hz is applied to it to enable continuous heating.

In such an apparatus, it is known that the distribution of density of eddy currents J generated in the metal strip 2 and of the temperature of the heated metal strip 2 depend in a complicated manner on the frequency of the alternating magnetic field, the relative difference between the width of the metal strip 2 and that of the electromagnet, the distance between the opposing electromagnets, the desired temperature of heating, the thickness of the metal strip 2 to be heated, and other factors. Of all these factors, relative difference between the dimension of the metal strip 2 in the direction perpendicular to that of the movement of the metal strip (hereafter referred to as the "strip width") and that of the electromagnet as viewed from the side of the strip may be attributable to the local generation of regions of highly dense eddy currents J (look at the shaded portions B in FIG. 3: these portions have a higher eddy currents density than those of the centrally-located shaded portions B') at the two edges of the metal strip 2 which run parallel to the direction of movement of the metal strip 2 (hereafter referred to as "strip edge portions"). These local hot spots mean that temperature is distributed unevenly in the metal strip, as shown in, for example, FIG. 4 (A) (in which, since the temperature distribution is substantially symmetrical with respect to the center of the strip, only one side of the strip is shown. All temperature distributions referred to hereafter are shown in the same manner). Such extreme temperature differences at the strip edge portions can cause faults during the heating treatment, including a reduction in the yield of metal strip due to the non-uniform disposition of grains of the metal strip as viewed from the side, and countermeasures must be taken to cope with such faults.

To obviate this problem, the electromagnets 6A and 8A in the known electromagnetic induction heating apparatus are each provided with a member for adjusting the magnetic flux density (generally called a flux modifier, and hereafter referred to as an "FM member") 20. The FM members 20 are mounted in an FM member moving frame body (not shown), in which they are separated from each other at predetermined intervals which correspond to those of the electromagnets 6A and 8A, and are disposed in such a manner that they can be slid against both edges of each of the electromagnets 6A and 8A which are closer to the metal strip 2 by a driving device (not shown) mounted in the FM member moving frame body. A distance l (see FIG. 2) between the edges of the FM members 20 and those of the electromagnets can be finely adjusted in accordance with the strip widths. Thus, the distribution of magnetic flux at the strip edge portions is adjusted in accordance with the strip widths, thereby minimizing the temperature differences generated by the uneven distribution of magnetic flux.

Other attempts to ameliorate the abovedescribed uneven distribution of temperature at the strip edge portions have been proposed in the specifications of, for example, Japanese Patent Laid-Open Nos. 1339/1978, 1614/1978 and 92428/1985.

Figure 2:
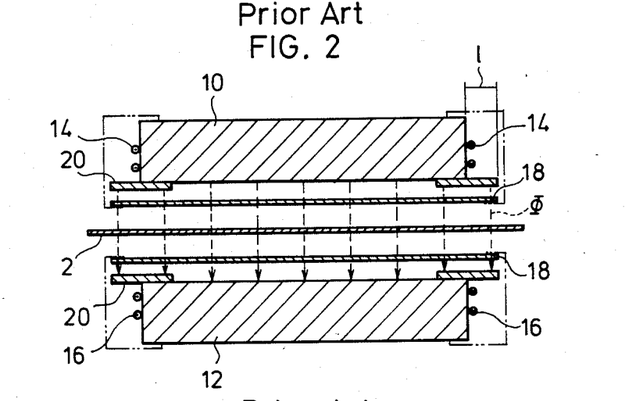
FIG. 2 is a schematic cross-section taken along the line II—II of FIG. 1.
Figure 3:
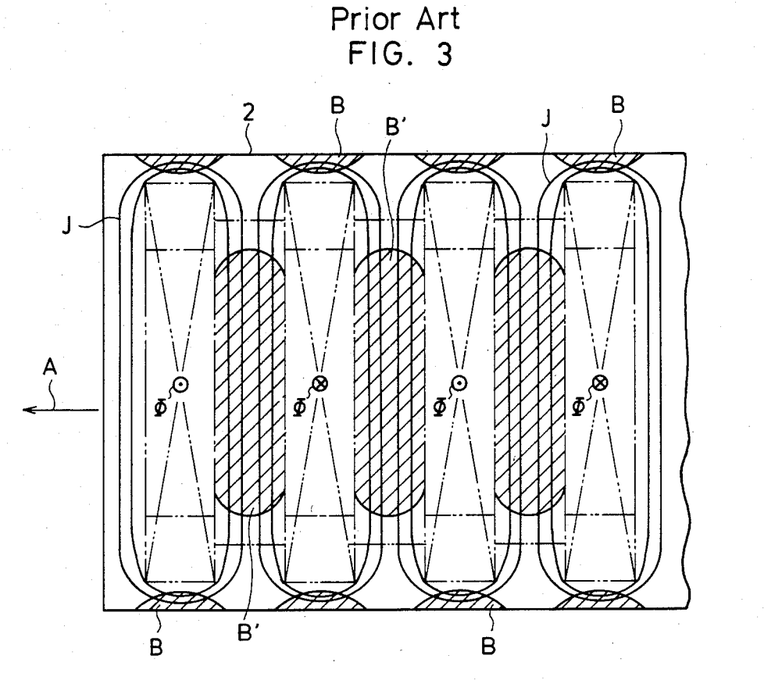
FIG. 3 is a plan view of which illustrating the distribution of density of eddy currents.
Figure 4A:
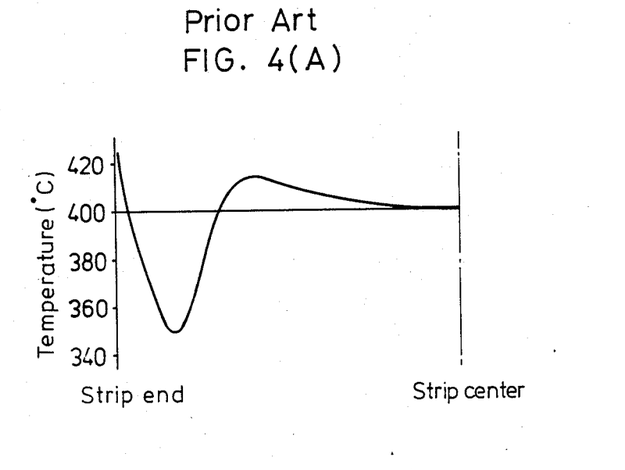
Figure 4B:
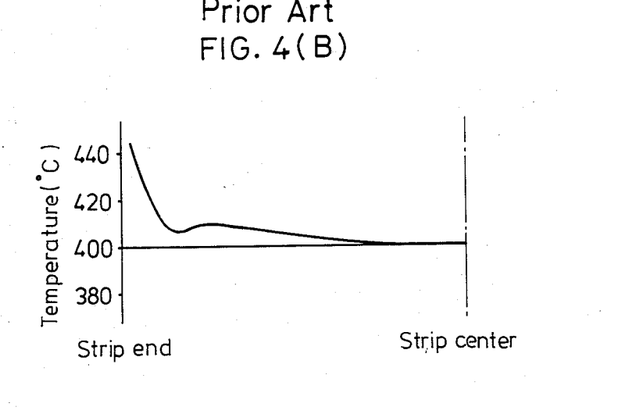

Of all of the above-described prior art, the method of ameliorating the uneven temperature distributions at the strip edge portions by adjusting the FM members 20, which is shown in FIGS. 1 to 3, makes it difficult to operate the apparatus with its control limit set below ±10° C., even if the distance l (see FIG. 2) of protrusion of each FM member 20 is adjusted to the optimum value. This method is therefore unsatisfactory from the viewpoint of quality control. If the distance l is set to a value more than the optimum value so that each FM member is positioned too close to the corresponding strip edge portion, the temperature is so distributed that the strip edge portions have an extremely high temperature, as shown in FIG. 4 (B), which could even make them melt.

The other methods disclosed in the specifications of Japanese Patent Laid-Open Nos. 1339/1978, 1614/1978 and 92428/1985 are of no practical use because of their requirement of large-scale equipment, or for other reasons.

SUMMARY OF THE INVENTION

Accordingly, an object of the present invention is to provide an electromagnetic induction heating apparatus which enables uniform and accurate electromagnetic induction heating by eliminating uneven temperature distributions on the strip edge portions by a simple method.

To this end, there is provided an electromagnetic induction heating apparatus which comprises predetermined pairs of electromagnets, each pair of electromagnets being disposed substantially symmetrically with respect to a passage through which a strip to be treated can be passed in a predetermined direction, so as to form an alternating magnetic field, wherein magnetic flux diverting means for diverting part of the alternating magnetic flux traversing the strip is provided in the vicinity of both edges of the strip which extend in the direction parallel to that of the movement of the strip.

According to the present invention, part of the alternating magnetic flux which passes through the edge portions of the strip to be treated (hereinafter referred to as "edge flux") can bypass the strip and run through the magnetic flux diverting means which forms a magnetic path bypass. The magnetic flux diverting means are formed from a ferromagnetic sheet, e.g., a silicon steel sheet which is laminated. It is therefore possible to eliminate the generation of extremely high temperature regions at the edge portions of the strip to be treated, which is caused by a highly dense magnetic flux distribution, thereby ensuring an uniform distribution of temperature over the entire strip.

BRIEF DESCRIPTION OF THE DRAWINGS

FIGS. 4 (A) and (B) are graphs showing how temperatures are distributed over the half width of a strip in a known electromagnetic induction heating apparatus;

FIGS. 9 (A) (B) and (C) are plan views of modifications of the second embodiment.

DETAILED DESCRIPTION OF THE PREFERRED EMBODIMENTS

A first embodiment of the present invention will be described hereinunder with reference to FIGS. 5 to 7. In these figures, the same reference numerals are used to denote the same components as those of the conventional apparatus taken in conjunction with FIGS. 1 to 3, and the description thereof is omitted or simplified.

Figure 5:
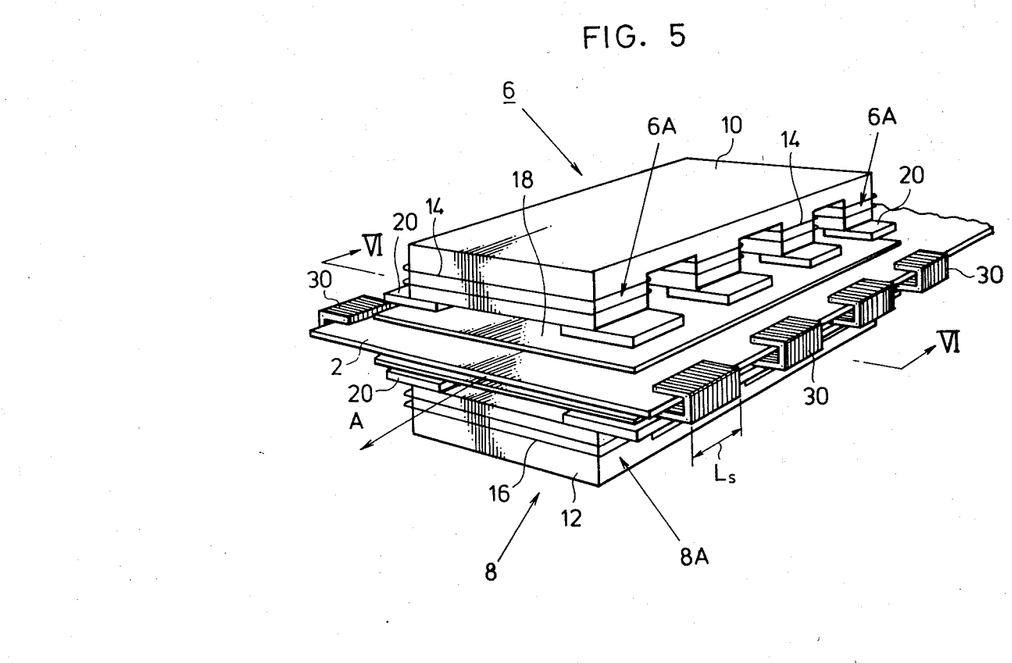
FIG. 5 is a schematic perspective view of a first embodiment of the present invention.
Figure 6:
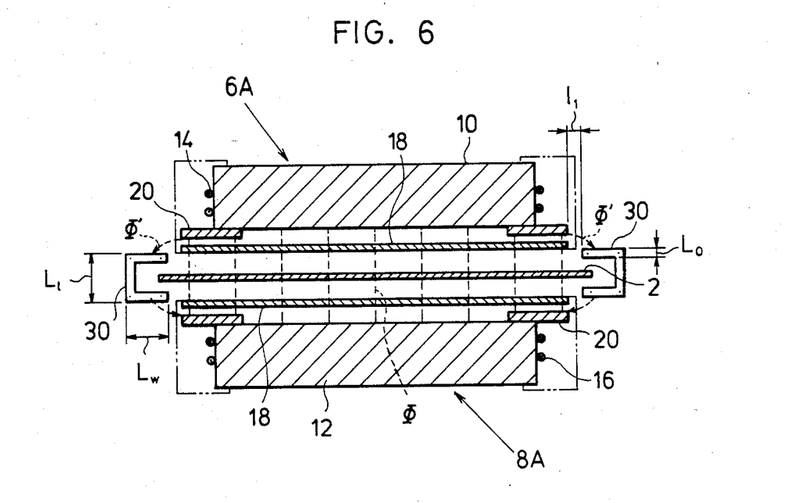
FIG. 6 is a schematic cross-section taken along the line VI—VI of FIG. 5.

Referring first to FIGS. 5 and 6, eight magnetic flux diverting members 30 for diverting edge flux are arranged by a support mechanism (not shown) at predetermined positions on both sides of the metal strip 2 to be treated, in such a manner that they are close to the strip edge portions. The magnetic flux diverting members 30 are made of a magnetic substance. This embodiment employs magnetic flux diverting members made of a silicon steel sheet of a ferromagnetic substance which is punched into substantially C shapes which are laminated on top of each other to form member of length Ls (see FIG. 5). The length Ls is equal to the width of each electromagnet 6A or 8A, as viewed from the side of the metal strip. The thickness Lo of each magnetic flux diverting member 30 (see FIG. 6) is set to a value (between 5 to 40 mm, for example) suitable for the heating conditions. The height Le and width Lw thereof (see FIG. 6) are also determined as appropriate.

As can clearly be seen in FIGS. 5 and 6, cores 10 and 12 of electromagnet 6A and 8A, respectively, are narrower in width than metal strip 2.

The magnetic flux diverting members 30 are spaced apart from the FM members 20 by a distance $l_1$ (see FIG. 6) in such a way that they are positioned at the mid point between the two components of each of the four pairs of electromagnets 6A and 8A, as viewed from the side of the metal strip, and at both edges of the passing metal strip 2 with the magnetic flux diverting members located at one edge of the metal strip facing another at the other edge, as viewed from the above. The distance $l_1$ can be adjusted in accordance with the strip widths. The adjustment can be conducted in practice by moving the support mechanism of the magnetic flux diverting members 30.

The support mechanism (not shown) supporting the magnetic flux diverting members 30 can be suitably constructed by, for example, securing the magnetic flux diverting members 30 aligned via an appropriate insulation material onto a fixing rod and by fixedly or movably securing the fixing rod in turn to the base of the mechanism. Alternatively, the magnetic flux diverting members 30 can be coupled to a worm gear mechanism so that they can be moved independently to each other, or entirely.

The operation of the first embodiment will be described below.

When an alternating current is passed through the coils 14 and 16 of each pair of the electromagnets 6A and 8A, the polarity of the electromagnets 6A and 8A switches instantaneously to N or S, generating a transverse magnetic flux $\phi$ (see FIG. 6) which runs perpendicular to the metal strip 2 passing through the passage provided between the electromagnets. It is arranged beforehand that this magnetic flux $\phi$ is generated in opposite directions in adjacent pairs of electromagnets. As a result, eddy currents are induced in the passing metal strip 2, heating the metal strip 2 by Joule heat.

In this case, of the lines of magnetic force $\phi$ running, for example, from one of the electromagnets 6A disposed on one side of the metal strip 2, some of the lines of edge flux force $\phi'$ which pass through the vicinity of the strip edge portions are attracted to the magnetic flux diverting members 30 disposed adjacent thereto. In other words, part $\phi'$ of the magnetic flux $\phi$ follows the magnetic flux diverting members 30 which form magnetic path bypasses on its way to the corresponding electromagnets 8A disposed on the other side of the metal strip 2, and bypasses the strip edge portions (see FIG. 6). This bypassing of the magnetic flux is conducted at a predetermined rate for each pair of electromagnets, and in opposite directions in adjacent pairs of electromagnets.

This provides the same effect as shielding part $\phi'$ of the magnetic flux $\phi$ at the strip edge portions of the metal strip 2, and the alternating magnetic flux can be therefore reduced to a predetermined amount. In other words, this can eliminate the local generation of highly dense magnetic flux regions (the shaded portions B in FIG. 3) at the strip edge portions, which could not be covered by the FM members 20 even if they were set to the optimum positions, and the magnetic flux density over the entire width of the metal strip becomes close to that of the central portion thereof (the shaded portions B' in FIG. 3). In consequence, the local generation of high temperature regions at the strip edge portions which occurs in the prior art can be prevented, thereby ensuring accurate heating.

The magnetic flux diverting members 30, in addition to their original task of causing part $\phi'$ of the magnetic flux $\phi$ to bypass, also attract the magnetic flux which passes through the FM members 20 further toward the strip edge portions, so that they act as secondary FM members. It is therefore possible to distribute eddy currents more uniformly by suitably selecting the positions of the FM members and magnetic flux diverting members in accordance with the strip widths.

The result of the experiment of this embodiment will be described in detail.

After the FM members 20 had been adjusted in positions which ensure the temperature distributions shown in FIG. 4 (B) during the heating, the pair of magnetic flux diverting members 30 were installed on the second pair of electromagnets from the inlet of the strip to be treated, with each magnetic flux diverting member 30 mounted on each electromagnet. The metal strip 2 of an aluminum alloy strip (according to JIS (Japanese Industrial Standard) A 5052) having a width of 1520 mm and thickness of 1.5 mm was passed through the apparatus at a speed of 15 m/min. An alternating magnetic flux of 176 Hz was applied to the strip. The desired heating temperature was 400° C. The dimensions Lo, Le and Lw of each magnetic flux diverting member 30 were set to 12 mm, 70 mm and 120 mm, respectively (see FIG. 6). The length Ls was made the same as the width of each electromagnet as viewed from the side of the metal strip. The magnetic flux diverting members were made of an anisotropic silicon steel sheet of 0.5 mm thickness by laminating it on top of another. The magnetic flux diverting members 30 were juxtaposed with respect to the strip in such a way that the strip edge portions were inserted about 70 mm toward the center of the magnetic flux bypassing members.

Figure 7:
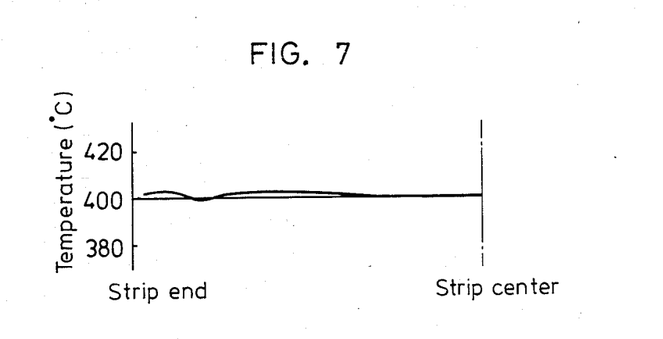
FIG. 7 is a graph of data obtained in an experiment into temperature distribution over the half strip width.

When the strip was heated, the temperature distributions shown in FIG. 7 were obtained. Namely, as is clear from this data, the generation of high temperature regions at the strip edge portions as occurred in the prior art (see FIGS. 4 (A) and (B)) were eliminated. It was also concluded that the temperature could be distributed uniformly over the entire strip widths.

The bypassing of magnetic flux can be conducted relatively simply in this embodiment. This makes the apparatus relatively small in size and practical.

Further, in this embodiment, since the generation of extra high temperature regions at the strip edge portions is prevented by diverting the edge flux, power needs can be lowered, thereby contributing to energy saving.

The first embodiment employs substantially C shaped magnetic flux diverting members 30. However, they may have a semicircular configuration. The length Ls of each magnetic flux diverting member 30 is not limited to that of this embodiment. It may be set to any suitable dimension which, for example, enables the magnetic flux diverting member to extend over two or more pairs of electromagnets. The magnetic flux diverting members 30 may be disposed in another way in accordance with the connection of an electromagnetic circuit or desired heating temperature. For example, they may be arranged at both edges of the metal strip 2 in a staggered way with respect to the center of the strip which runs parallel to the direction of movement of the metal strip. magnetic flux diverting members of several sizes may be prepared beforehand, and those of an adequate size may be mounted on their support mechanism in accordance with the size and target heating temperature of the metal strip 2 every time they are used.

A second embodiment of the present invention will be described hereinunder with reference to FIG. 8, in which the same reference numerals designate those parts which correspond to those of the first embodiment, and description thereof is omitted.

Eight flat plate-shaped magnetic flux diverting members 40 of the magnetic flux diverting means, which are made of a ferromagnetic sheet such as a silicon steel sheet by laminating it on top of another as in the first embodiment, are disposed between the adjacent electromagnets located on both sides of the metal strip 2 by a support mechanism (which allows adjustment of the position of the magnetic flux diverting members, though not shown). Each magnetic flux diverting member 40 has a length Ls which allows it to extend over the adjacent electromagnets in the vicinity thereof. A thickness Lo and a distance between the plates lk are both set at predetermined values. The distance lm between each FM member 20 and each magnetic flux diverting member 40 is set to a value (lm < lk) which enables the magnetic flux diverting member to attract part of the magnetic flux.

The operation of the second embodiment will be described below.

The electromagnets 6A and 8A are operated in the same manner as in the first embodiment so as to generate a magnetic flux which runs perpendicular to the metal strip 2. At this time, part of the magnetic flux generated through the FM members 20 bypasses the latter to the adjacent electromagnets by following the magnetic flux diverting members 40, and this bypassing of part of the magnetic flux is conducted in each magnetic flux diverting member 40. This can provide the same effect as shielding of part of magnetic flux which runs through both strip edge portions, thereby ensuring uniform temperature distributions.

More specifically, in addition to the fact that the present embodiment ensures the same effect as that of the first embodiment, it enables a simpler construction of the magnetic flux diverting members 40.

Figure 9A:
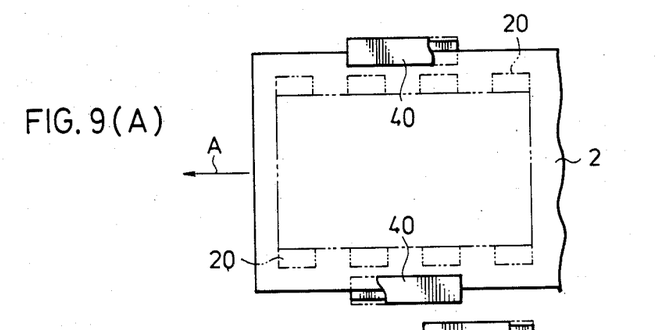
Figure 9B:
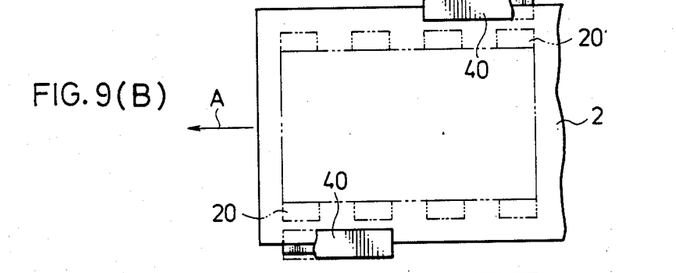
Figure 9C:
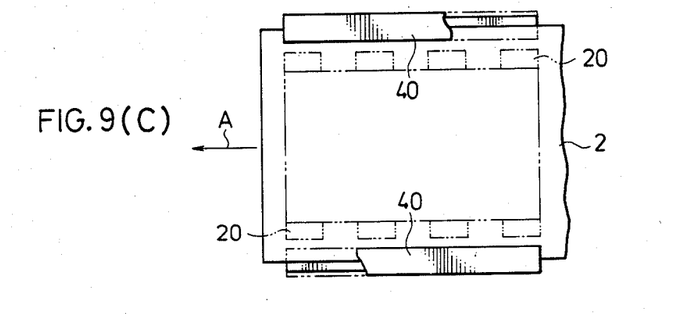

In the second embodiment, the disposition of the magnetic flux diverting members 40 in the direction of movement of the strip to be treated is not limited to that described above. It may be modified in accordance with the heating temperature or ambient conditions, as shown in FIG. 9.

In the modification shown in FIG. 9 (A), the magnetic flux diverting members 40 face only two centrally-located pairs of electromagnets above and below the metal strip 2. The magnetic flux diverting members 40 may be arranged in a staggered way, as shown in FIG. 9 (B), above and below the metal strip 2. They may also be arranged so as to extend over all four pairs of electromagnets on both sides and above and below the metal strip 2, as shown in FIG. 9(C). In each example of the arrangement of the magnetic flux bypassing members which is shown in FIGS. 8, 9(A), 9(B) or 9(C), the magnetic flux diverting members 40 may be disposed above or below the metal strip 2 at both side for strip width direction. Any combination of the above-described examples is also possible.

Figure 8:
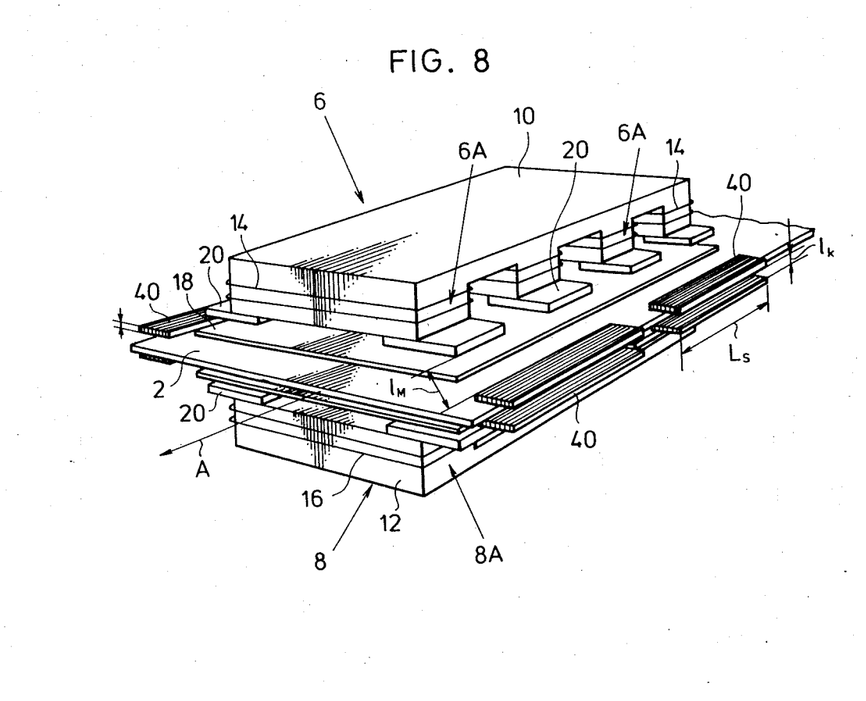
FIG. 8 is a schematic perspective view of a second embodiment of the present invention.

The above-described embodiments employ substantially C shaped or flat plate shaped magnetic flux diverting members, as shown in FIGS. 5 and 8, respectively. However, the configuration of the magnetic flux diverting members is not limited to those, and they may, for example, be used by combining these two configurations. The height or vertical spacing between two magnetic flux diverting members may be slightly larger than that of the FM members. The magnetic flux diverting members 40 shown in FIG. 8 may have a flat-plate shape so as to face the adjacent FM members 20 and an inverted U shape as viewed from the side of the metal strip 2 which is formed by laminating the silicon steel sheet on top of another from the inner side toward the outer side. The magnetic flux diverting members may be provided with a cooling mechanism which blows out a cooling gas such as air, so as to prevent them from experiencing too high a temperature. Both of the above-described embodiments of the present invention employ four pairs of electromagnets, each of which has the same heating capability. The present invention is applicable to such an apparatus that incorporates suitable pairs of electromagnets (the number of pairs ranging between 1 and 10), depending on the desired heating temperature, or an apparatus having a pair of electromagnets located at one position (for example, at the inlet, outlet, or central position have different heating capacities when compared to each other). The present invention may also be applied to an apparatus in which the metal strip is conveyed in the vertical or horizontal direction.

According to the present invention, the generation of regions of highly dense eddy currents at the strip edge portions can be eliminated by incorporating magnetic flux diverting means. This enables uniform temperature distributions over the entire strip to be treated with a simple structure and resultingly accurate heating of the strip.

What is claimed is:

1. An electromagnetic induction heating apparatus for heating a strip which has a predetermined width, as measured between opposed strip edges, and which is moved at a predetermined speed in a predetermined direction, said apparatus comprising:
   (a) a pair of electromagnetic assemblies positioned in spaced relationship from each other so to define a passageway along which said strip is adapted to be moved in said predetermined direction, said electromagnetic assemblies forming an alternating magnetic field, each of said assemblies comprising a plurality of electromagnets, each of said electromagents having a width in a direction transverse to said predetermined direction which is less than the width of said strip;
   (b) means for adjusting magnetic flux generated by said electromagnetic assemblies, said adjusting means comprising a plurality of flux modifiers, each of said electromagnets having opposed ends between which said electromagnet width is defined, said flux modifiers being slidably positioned on opposite ends of said electromagnets, said flux modifiers being mounted adjustably with respect to the width of said strip, said flux modifiers thereby comprising means for moving a portion of the magnetic flux generated by said electromagnetic assemblies towards said opposed edges of said strip; and
   (c) means for diverting said magnetic flux which traverses an area adjacent to said strip edges, said diverting means comprising a laminated ferromagnetic sheet which is positioned adjacent said opposed strip edges, said magnetic flux diverting means comprising a plurality of magnetic flux diverting members which are independent from said electromagnetic assemblies and said magnetic flux adjusting means, each of said magnetic flux diverting members having one surface which faces a top surface of said strip and one surface facing a bottom surface of said strip, said magnetic flux diverting members extending in a direction which intersect said predetermined direction along which said strip is adapted to be moved, said magnetic flux diverting members thereby comprising means for diverting a portion of said magnetic flux in order to uniformly heat said strip across the width of said strip.

2. An electromagnetic induction heating apparatus according to claim 1, wherein each of said magnetic flux diverting members comprises a substantially C-shaped magnetic flux diverting member.

3. An electromagnetic induction heating apparatus according to claim 2, wherein each of said magnetic flux diverting members is longer, in a direction substantially parallel to said predetermined direction, than each electromagnet in a pair of electromagnets which are separated by said strip, each pair of electromagnets being substantially vertically aligned.

4. An electromagnetic induction heating apparatus according to claim 2, wherein each of said magnetic flux diverting members is longer than at least two pairs of said electromagnets which are separated by said strip.

5. An electromagnetic induction heating apparatus according to claim 2, wherein magnetic flux diverting members located along opposed sides of said strip are disposed in a staggered manner with respect to a central line which is parallel to the predetermined direction of movement of said strip.

6. An electromagnetic induction heating apparatus according to claim 2, wherein each of said magnetic flux diverting members comprises a laminated silicon steel sheet.

7. An electromagnetic induction heating apparatus according to claim 1, wherein each of said magnetic flux diverting members comprises a pair of flat-plates which are spaced from each other in a substantially vertical direction.

8. An electromagnetic induction heating apparatus according to claim 7, wherein magnetic flux diverting members located along opposite sides of said strip are disposed in a staggered manner with respect to a central line which is parallel to said predetermined direction of movement of said strip.

9. An electromagnetic induction heating apparatus according to claim 7, wherein each of said magnetic flux diverting members comprise a laminated silicon steel sheet.

10. An electromagnetic induction heating apparatus in accordance with claim 1, wherein said flux diverting members are spaced from said electromagnet ends in a direction transverse to said predetermined direction are positioned about said opposed strip edges.

11. An electromagnetic induction heating apparatus according to claim 1, wherein said ferromagnetic sheet comprises a laminated silicon steel sheet.

* * * * *